United States Patent [19]

Mikina

[11] Patent Number: 4,606,437
[45] Date of Patent: Aug. 19, 1986

[54] DISC BRAKE

[76] Inventor: Stanley J. Mikina, 4782 Coquinia Key Dr., St. Petersburg, Fla. 33705

[21] Appl. No.: 617,514

[22] Filed: Jun. 4, 1984

[51] Int. Cl.[4] ............................................ F16D 55/18
[52] U.S. Cl. .................................................. 188/72.4
[58] Field of Search ....................... 188/26, 28, 31, 56, 188/59, 71.1, 71.8, 72.1, 72.4, 72.2, 72.6, 72.9, 151 R, 346, 72.5; 403/119, 150

[56] References Cited

U.S. PATENT DOCUMENTS

| | | | |
|---|---|---|---|
| 2,686,576 | 8/1954 | Bachman et al. | 188/59 X |
| 2,942,697 | 6/1960 | Polanin | 188/59 X |
| 3,371,750 | 3/1968 | Schutte et al. | 188/72.6 X |
| 3,664,468 | 5/1972 | Oka | 188/72.2 |
| 3,734,248 | 5/1973 | Fay | 188/72.4 X |
| 3,869,024 | 3/1975 | Hauth et al. | 188/72.2 X |
| 3,900,083 | 8/1975 | Hauth | 188/72.2 |
| 4,050,548 | 9/1977 | Margetts | 188/71.8 |
| 4,454,932 | 6/1984 | Emilsson et al. | 188/59 |

*Primary Examiner*—Bruce H. Stoner, Jr.
*Assistant Examiner*—Robert Oberleitner
*Attorney, Agent, or Firm*—William J. Ruano

[57] ABSTRACT

A disc brake with caliper mounted brake shoes and including the negative feedback of the brake shoe friction forces to oppose the applied hydraulic brake actuating force for the purpose of reducing variations in brake torque due to random variations in the coefficient of friction between brake shoes and brake disc. The brake shoe friction force feedback is accomplished by means of a fulcrumed lever at each shoe, and with the hydraulic piston actuating force applied to the shoe and lever assembly through a ball bearing mounted on the piston that permits the entire sliding friction force of the brake shoe to be converted, without diminution to a force acting in a direction opposite the applied brake actuating hydraulic force. Feedback embodiments are shown both for the rigidly mounted brake caliper with two opposed actuating pistons, and for the sliding or floating brake caliper with a single actuating piston and an opposed caliper reaction force. These feedback embodiments automatically permit negative feedback for both directions of wheel and disc rotation.

18 Claims, 8 Drawing Figures

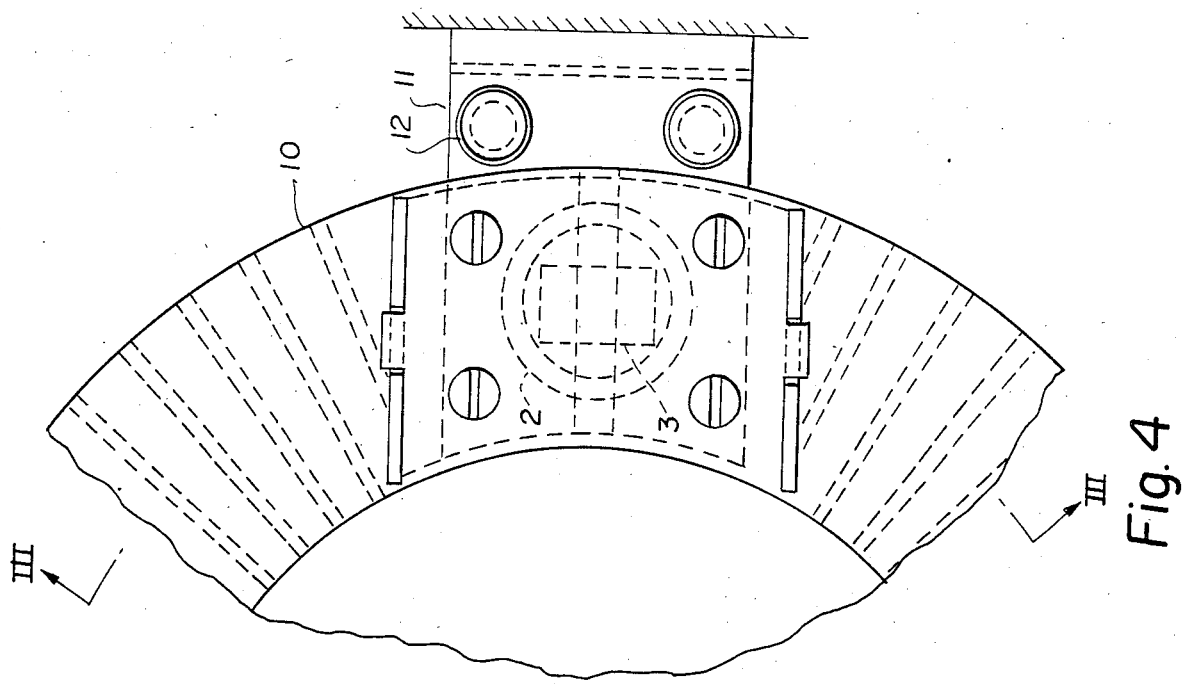
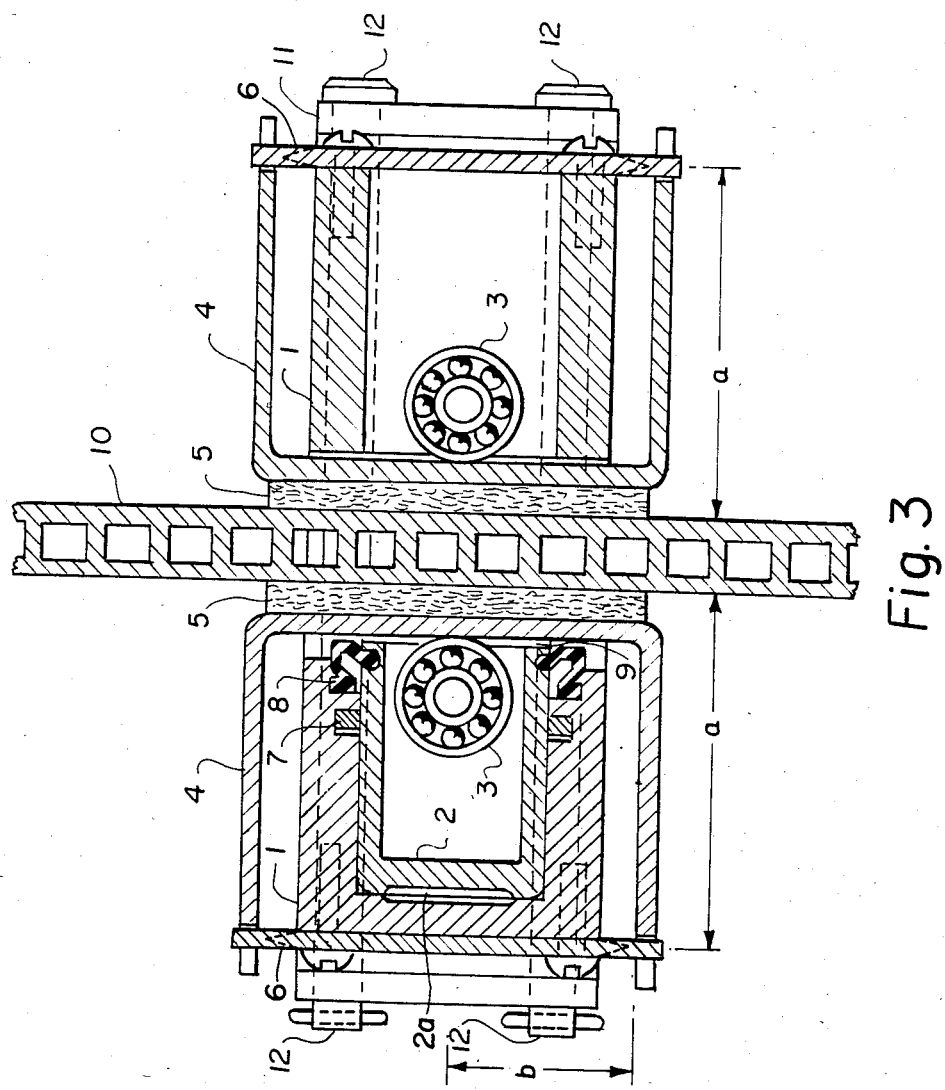

DISC BRAKE

BACKGROUND OF THE INVENTION

This invention relates to disc brakes in general, but in particular to disc brakes for vehicles. It is intended to alleviate the problem of maintaining a safe ratio between the braking effort at the front and rear of the vehicle in spite of the variations in the coefficient of sliding friction at the brake shoes. A further object of this invention is to maintain an adequate and effective brake torque even with unfavorable conditions of brake shoe friction.

In order to insure that braking torques on front and rear wheels are properly proportioned to avoid unsymmetrical wheel locking and car skidding, means such as a proportioning valve are used to distribute the hydraulic brake actuating force at the front and rear wheels so as to maintain a fixed ratio of rear to front brake torques. However, such means are made less effective if the friction coefficient of sliding friction between the brake shoe and disc varies in a random and unpredictable manner due to such factors as corrosion, wear, or moisture, and other chemical and physical changes.

SUMMARY OF THE INVENTION

In my invention, the effect of such variations in brake friction coefficient is greatly reduced by utilizing the principle of negative feedback to compensate for friction variations. In my embodiment of this negative force feedback, the friction forces acting on each brake shoe and in the plane of the brake shoe face are caused to apply a counterforce opposing the hydraulic force on each brake actuating piston. This counterforce or negative feedback force is proportional to the resultant normal force acting on each brake shoe. This resultant normal force is equal to the arithmetic difference between the applied hydraulic force and resultant normal force multiplied by the coefficient of sliding friction and by a feedback lever ratio.

The disc rotation converts this resultant normal brake force into a force parallel to the brake shoe face and in the direction of the disc rotation. It is an object of this invention to convert this sliding brake shoe force into a force parallel to the hydraulic piston axis and opposing the hydraulic force, and to do so in a simple, reliable, and efficient manner.

The transformation of the brake shoe sliding force into an opposed axial force on the hydraulic piston is accomplished by mounting each brake shoe on a rectangularly-shaped lever having two fulcrum points, one for each direction of disc rotation. The fulcrum points are formed by plates having sharp edged ends and attached to the back ends of the hydraulic cylinders or caliper ends. Alternatively, pivots $P_1$ and $P_2$ may consist of a moderately sharp edge on fulcrum plate 6, say between 60° and 90° included edge angle, bearing against a strip of heat resisting semi-rigid elastomer 13 connected to engaging lever 4. By supplying axial reaction forces, this pivot will assure more uniform wear of the brake shoe lining. An enlarged view of the pivot is shown in FIG. 5.

In order to get the desired feedback ratio, the lever fulcrums are necessarily distant from the brake shoe face. However, this seemingly unfavorable geometry in no way detracts from the effectiveness of the lever system, since during operation the brake shoe never leaves the disc surface. The brake functions with changes in normal pressure between the brake shoe and disc. These pressure changes can occur with infinitesimal displacements of the parts in question, equal in magnitude to the elastic displacements of bodies in compression. The large long term displacements of the brake shoes due to wear are accomodated by means of slots in levers 4 and engaging tongues in the fulcrum plates 6.

One other important and indispensable feature of the invention is the provision of a ball bearing or other anti-friction type of bearing at the back sides of the brackets to which the brake shoes are attached. The ball bearing is mounted on the end of the hydraulic piston and serves as the connecting member between the applied hydraulic force and the reaction force from the disc and brake shoes. Without this bearing, the required force feedback would be impossible to achieve. It permits the lever assembly to move freely the minute distance required to cause changes in normal pressure at the brake shoe faces. Without the bearing, the friction force on the back sides of the shoe and lever would be greater than the sliding friction force at the shoe face and would completely nullify any force feedback effects.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIG. 3 is a circumferential section taken along line III—III of FIG. 4 through the disc and caliper assembly showing a single hydraulic piston and a floating or sliding caliper whose reaction force balances the applied hydraulic force;

FIG. 4 is an end view of the disc and caliper assembly showing details of the fulcrumed lever and the sliding support for the caliper body;

DETAILED DESCRIPTION OF THE EMBODIMENTS

Figure 2:
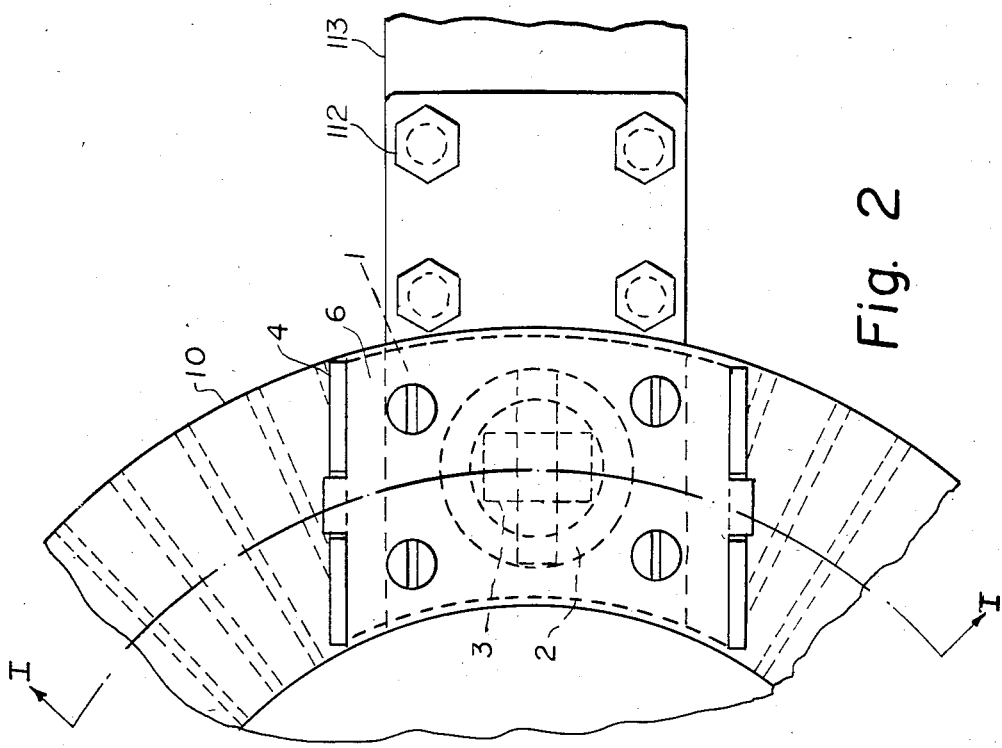
FIG. 2 is an end view of the disc and caliper showing details of the fulcrumed lever and caliper support.
Figure 1:
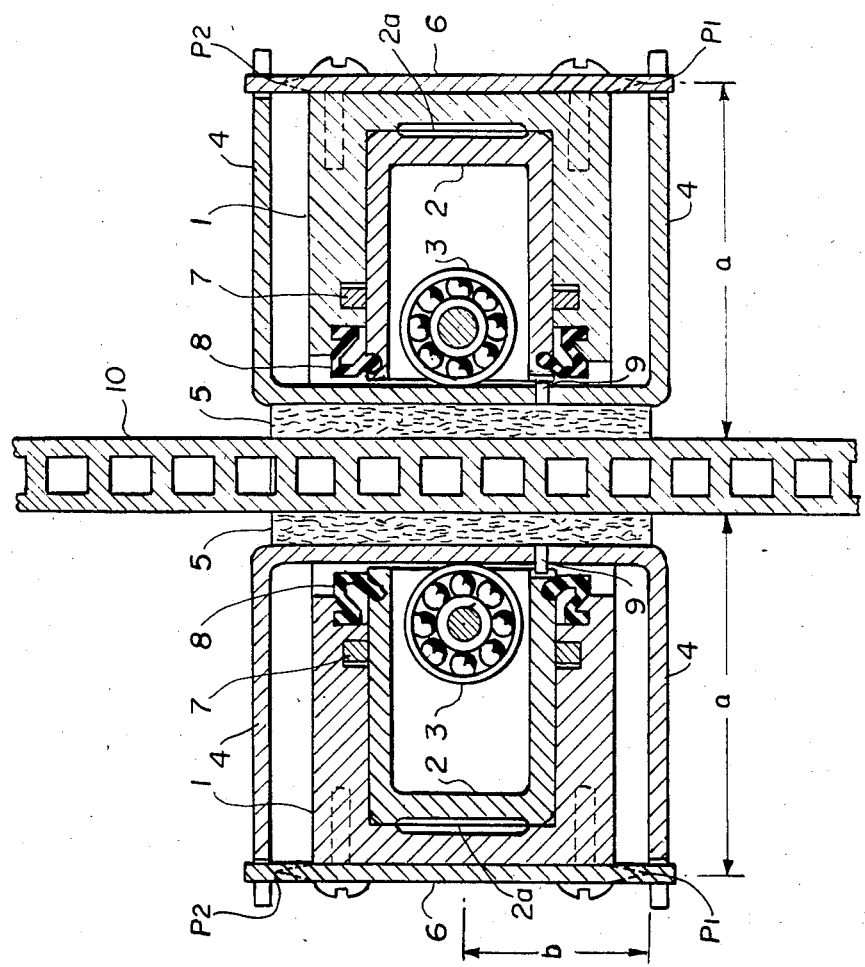
FIG. 1 is a circumferential section taken along line I—I of FIG. 2 through the disc and caliper assembly showing two opposed hydraulic pistons, with the cylinders forming a part of a caliper assembly rigidly bolted to a fixed anchor bracket.

Referring to the rigidly mounted caliper design of FIGS. 1 and 2, two identical caliper sub-assemblies are bolted together after machining. Each consists of a cylinder 1, a piston 2, a sealed bearing 3 connected to piston 2, a rectangularly shaped lever 4, and its attached brake shoe 5, a fulcrum plate 6 mounts on cylinder 1, a piston or hydraulic seal 7, a dust boot 8, and a piston anti-rotation pin 9. FIG. 2 shows that cylinders 1 are attached to a mounting bracket 113 by bolts 112. The ventilated brake disc 10 is subjected to equal braking forces on each side from pistons 2, bearings 3, levers 4, and brake shoes 5. Upon introducing brake operating fluid in chambers 2a, pistons 2 will force anti-friction bearings 3 against levers 4 so as to force brake shoes 5 against rotating disc 10.

Without feedback, the resultant normal brake force is equal to the hydraulic piston force, or $$F_r = F_h \tag{1}$$

Feedback occurs when the sliding friction force at each brake shoe face exerts a moment on lever 4 about pivot $P_1$ for the direction of rotation indicated. (For the other direction of rotation, the pivot is at $P_2$.) If the resultant normal force at the brake shoe face is $F_r$, the sliding friction force is $uF_r$ for a coefficient of friction u, the friction moment on lever 4 about pivot $P_1$ is a $uF_r$, and the feedback force acting on bearing 3 is $uF_r a/b$. The relation between these forces that expresses the feedback condition is:

$$F_r = F_h - uF_r a/b \tag{2}$$

Solving this for $F_r$ gives:

$$F_r = \frac{F_h}{1 + ua/b} \tag{3}$$

For a shoe radius R from the disc center, the disc brake torque is:

$$T = 2RuF_r = \frac{2RF_h u}{1 + ua/b} \tag{4}$$

Relation (4) illustrates the feedback effect in reducing changes in T with changes in u. As the numerator increases due to an increase in u, the denominator also increases by the factor ua/b to reduce the increase in T. In the limit when ua/b is large compared to 1, u is effectively cancelled from both numerator and denominator and the brake torque is independent of u.

In a practical embodiment of this feedback principle, it is not possible to make ua/b large compared to 1. However, even a modest increase in the factor ua/b can result in an appreciable improvement in the consistency of the brake torque T. This is shown in the table below for the lever ratio of a/b = 1.85 illustrated in the drawings and covering a wide range of coefficents of friction u.

| u | 1 | .9 | .8 | .7 | .6 | .5 | .4 | .3 | .2 | .1 |
|---|---|---|---|---|---|---|---|---|---|---|
| $\frac{T}{2RF_h}$ | .351 | .337 | .323 | .304 | .284 | .260 | .230 | .193 | .146 | .084 |

A comparison of these figures shows for example that a 10% drop in u from 1 to 0.9 gives only a 3.7% drop in brake torque.

A 30% drop in u from 1 to 0.7 gives only a 13.4% drop in brake torque.

A 50% drop in u from 1 to 0.5 give a 25% drop in brake torque. At the lower end of the table, a 5 to 1 change in u from 0.5 to 0.1 gives a 3 to 1 change in the brake torque.

Without feedback, the brake torque would vary directly with u and be equal to $2RF_h u$. The line for u in the above table is thus equal to the brake torque for no feedback.

Figure 6:
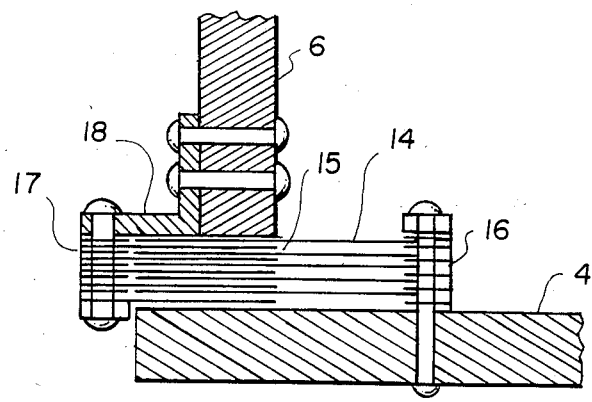
FIG. 6 shows another pivot modification

Another thing, that is noticeable in the table, is that the brake torque with feedback is less than without feedback. This is to be expected, since the feedback force opposes a more uniform brake torque. To bring the brake torque up to the required value, the hydraulic pressure on the piston or its diameter, or a combination of both, will have to be increased, depending on the expected range of u to be covered. This would present no problem. The embodiment for a floating or sliding brake caliper with only a single hydraulic piston is shown in FIG. 3 and FIG. 4. Here, the fulcrumed levers and bearing are identical with those of FIGS. 1 and 2 for the two piston rigid caliper embodiment. The only change is the provision of a bracket 11 and rods 12 on which the caliper body is free to slide to balance action and reaction forces in the direction of the piston axis Another pivot modification is shown in FIG. 6. This consists of interleaved stacks of thin sheets that form an effective hinge for lever 4 relative to fulcrum plate 6. The sheets marked 15 are attached to bracket 18 with spacers 17 and a connection to fulcrum plate 6. The sheets marked 14 are attached to lever 4 with spacers 16 and are interleaved with sheets 15. The brake shoe friction force is transmitted through lever 4 to compress the sheet assembly against fulcrum plate 6. The interleaf friction on the multiple surfaces then provides the axial reaction force to balance the feedback force against the bearing on the end of the hydraulic piston. Sheets 14 are made long enough to engage sheets 15 and plate 6 over the full range of brake lining wear at the shoes.

Figure 7:
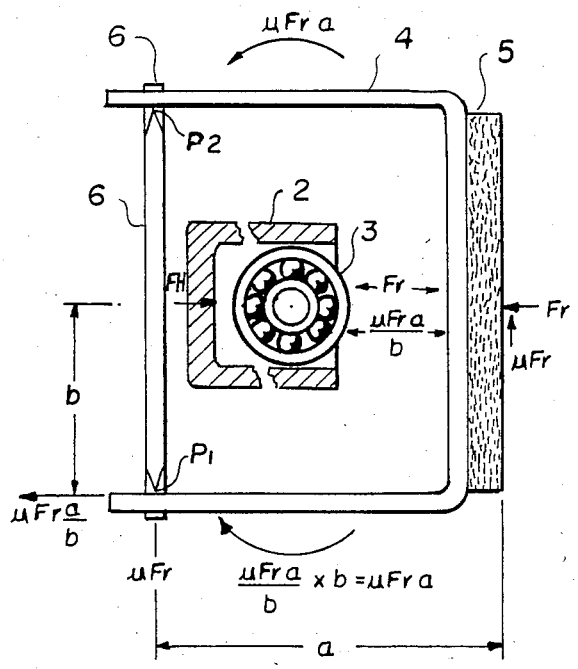
FIGS. 7 and 8 show details of the pivots in FIGS. 1 and 3,—also showing distribution of forces and moments on lever 4 to maintain equilibrium.
Figure 8:
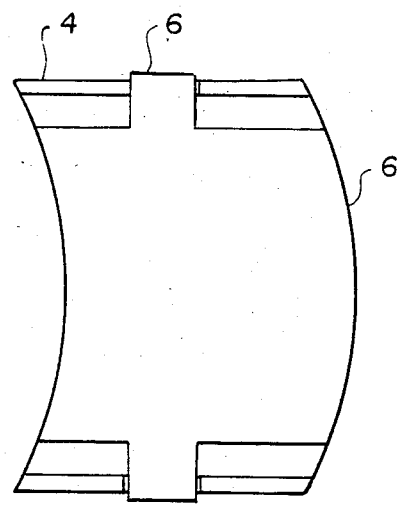

Details of pivots $P_1$ and $P_2$ in FIGS. 1 and 3 are shown in FIGS. 7 and 8. FIG. 7 also shows the distribution of the forces and moments acting on lever 4 so as to maintain equilibrium. It is seen that pivot $P_1$ for example, must supply an axial force $uFr a/b$ to prevent tilt of brake shoe 5 and uneven wear of the brake lining. To insure that pivots $P_1$ and $P_2$ have such reaction force capability in FIGS. 1 and 3 and FIGS. 7 and 8, the fulcrum plate 6 is made with sharp edges that will resist sliding on lever arms 4.

Figure 5:
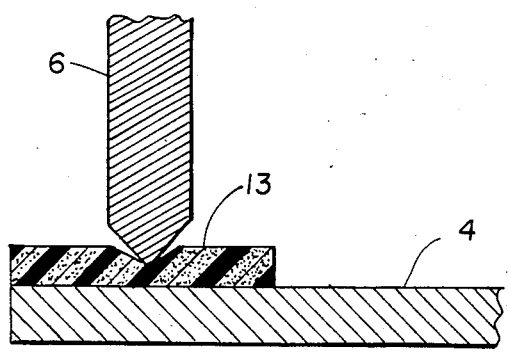
FIG. 5 is an enlarged sectional view of the pivot.

Progressively greater anti-slide capability of the pivots is shown in the pivot modifications of FIGS. 5 and 6. In FIG. 6, the lateral hinge compressing force $uF_r$ occurs simultaneously with the axial reaction force $uFr$ a/b and is thus able to provide the required hinge friction force at the time when its needed. The pivots of FIG. 6 are the preferred embodiment.

The sliding brake shoe force is converted to a force parallel to the hydraulic piston axis by rotation of lever frame 4 about $P_1$ or $P_2$ in FIG. 7. The forces which must be considered in the equilibrium of the system are clearly shown in FIG. 7. Lever frame 4 will move about pivots $P_1$ or $P_2$, depending on direction of rotation, and this rotation of lever frame 4 will have a component along the piston axis. Bearing 3 is necessary because the feedback force from the sliding brake shoe would be prevented from rotating lever frame 4 if there were friction forces between the end of the piston and lever frame 4 in the brake shoe face direction. Ball bearing 3 eliminates these detrimental friction forces.

The combination of up-and-down motion of bearing 3 and lateral or side-to-side motion of fulcrum lever 4 is possible because of the ability of the ball bearing 3 to rotate. The ball bearing 3 is an indispensable part of the invention. Without it, the sliding friction force of the brake shoes would just laterally force the piston against the cylinder wall and would not produce any rotation moment on lever frame 4 about pivots $P_1$ and $P_2$.

For the range of coefficients of friction "u" involved in a disc brake, the negative feedback force (u Fr a)/b is always less than the applied hydraulic piston force Fr. Consequently, the brake shoe 5 never leaves contact with the brake disc 10. The equilibrium relations shown in FIG. 7 therefore assume their values with simply changes in pressure between brake shoe 5 and and disc 10 and only infinitesimal elastic displacements of the working parts that do not produce any appreciable changes in the geometry illustrated in FIG. 7. The large changes in geometry due to wear of the brake shoes and disc occur slowly over long periods of time and have no effect on the instantaneous equilibrium relations shown in FIG. 7.

While preferred embodiments of this invention have been disclosed herein, many modifications are feasible. This invention is not to be restricted except to the entent necessitated by the prior art.

I claim:

1. A disc brake for a disc rotatable about an axis, caliper means mounted so as to slide in the direction of the disc axis, said caliper means including a pair of cylinders, only one being a hydraulic cylinder, including a single piston movable along said axis and with oil and dust seals, a pair of brake shoes for engaging opposite surfaces of said disc, two shaped levers for the brake shoes and surrounding said cylinders, fulcrum means for said levers in remotely spaced parallel relation to said shoes, an anti-friction bearing between the piston and one of said levers, said bearing being movable along said axis, anti-rotation means on the single piston, and an anti-friction bearing between the body of said caliper means and the other lever.

2. In a disc brake as recited in claim 1 wherein said fulcrum means comprises a fulcrum plate having pivots on each end so as to be effective for both directions of disc rotation for transferring a sliding friction force between brake shoe and disc into a force coaxial with the hydraulic piston and opposing the hydraulic force in a negative feedback relationship.

3. In a disc brake lever system as recited in claim 2 for negative feedback of brake shoe friction forces and having each pivot consisting of an edge of said fulcrum plate bearing against a heat-resisting semi-rigid elastomer strip attached to said lever.

4. In a disc brake system as recited in claim 2 for negative feedback of brake shoe forces, said pivots comprising interleaved sheets that are attached to the ends of said fulcrum plate and of said lever, respectively.

5. A disc brake comprising a rotatable disc, a caliper assembly supported on a mounting bracket further comprising already in, including a hydraulic cylinder and hollow piston means, lever means surrounding said cylinder means, brake shoes attached to the exterior central portions of said lever means for engaging opposite sides of said disc, and means including fulcrum means pivotally connected between said hydraulic cylinder means and said lever means and including anti-friction bearing means connected to said piston means interiorly thereof and engageable with the interior central portions of said lever means for applying negative feedback of brake shoe friction forces to oppose hydraulic brake actuating force applied to said piston means for reducing variations in brake torque due to random variations in the coefficient of friction between said brake shoes and said disc.

6. A disc brake as recited in claim 5 wherein said lever means is of "U"-shaped cross-section and surrounds said hydraulic and piston means, said fulcrum means comprising a fulcrum plate rigidly attached to said cylinder means and having opposite ends pivoted to the extremities of said "U"-shaped cross-section of said lever means for applying negative feedback in both directions of rotation of said disc.

7. A disc brake as recited in claim 6 wherein said fulcrum plate has pointed opposite ends, a heat-resisting semi-rigid elastomer strip rigidly mounted on said lever means and engageable with said pointed ends to form said pivotal mounting.

8. A disc brake as recited in claim 6 wherein said fulcrum plate has interleaved stacks of springy laminated sheets on its opposite ends connected to said lever means to form said pivotal mounting, said sheets being squeezed by brake shoe friction forces to resist separation of the laminations in the direction of the lamination planes and to provide an equilibrating tension force for the feedback force at the hydraulic piston.

9. A disc brake as recited in claim 5 wherein said hydraulic cylinder and piston means comprises a pair of cylinders and a pair of pistons therein, said lever means comprising a pair of levers, said fulcrum means comprising a pair of fulcrum plates rigidly mounted on said cylinders and having opposite ends pivoted to the ends of said levers, and said anti-friction bearing means comprises a ball bearing connected inside each of said pair of pistons engageable with an intermediate portion of one of said levers in response to applied hydraulic brake operating pressure, and wherein said caliper assembly is rigidly mounted on said mounting bracket.

10. A disc operating brake as recited in claim 9, together with a piston dust boot and piston oil seal between each of said pair of cylinders and pistons.

11. A disc operating brake as recited in claim 9 wherein each of said levers together with said fulcrum plates forms an enclosure for each of said hydraulic cylinders and pistons.

12. A disc brake assembly as recited in claim 5 wherein said caliper assembly is slidably mounted on said mounting bracket in the direction of the rotational axis of said disc, and wherein said lever means comprises a pair of levers, and wherein said cylinder and piston means comprises only one cylinder and one piston, and wherein said lever means comprises a pair of levers of "U"-shaped cross-section, one of which surrounds said cylinder and piston means.

13. A disc brake as recited in claim 12 wherein said anti-friction bearing means comprises a pair of anti-friction ball bearings, each engageable with an intermediate portion of one of said levers and being surrounded thereby.

14. A caliper mounted disc brake assembly for braking a rotary disc, comprising a pair of substantially rectangular lever assemblies in confronting relationship on opposite sides of said disc, each having a "U"-shaped element with a brake shoe attached outwardly of the bight portion of said element and with its extremities extending outwardly of said brake shoes and a fulcrum plate having a fulcrum point on each end, said fulcrum plate bridging said extremities of said "U"-shaped element and being pivotally mounted on said extremities to provide pivotal movement for both directions of rotation of said disc, a cylinder enclosed in each "U"-shaped element and rigidly attached to the corresponding fulcrum plate, a stationarily mounted bracket rigidly secured to said fulcrum plates, an anti-friction element mounted on an end of each of a pair of pistons and being engageable with the inner surface centrally of the bight portion of the corresponding "U"-shaped element and movable along the rotational axis of said disc upon actuation of the corresponding piston so that the entire sliding force of the brake shoes is converted to a force acting in a direction opposite the applied brake actuating force, providing negative feedback for both directions of disc rotation to compensate for friction variations between said shoes and disc.

15. An assembly as recited in claim 14 together with elastomers mounted on the extremities of said "U"-shaped elements which said fulcrum points of said fulcrum plates engage.

16. An assembly as recited in claim 14 wherein said fulcrum points of said fulcrum plates are interleaved springs interconnecting said plates and the extremities of said "U"-shaped elements.

17. An assembly as recited in claim 14 together with a hydraulic seal and dust boot provided between the end portion of each cylinder and piston.

18. An assembly as recited in claim 17 together with an anti-rotation pin between each cylinder and said inner surface of said bight portion.

* * * * *